(12) United States Patent
Jacobs et al.

(10) Patent No.: US 7,172,179 B2
(45) Date of Patent: Feb. 6, 2007

(54) METHODS AND APPARATUS FOR MIXING FLUIDS

(75) Inventors: Garry E. Jacobs, Aliso Viejo, CA (US); Steven W Stupin, Orange, CA (US); Adam S. Milliken, Columbus, OH (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 160 days.

(21) Appl. No.: 10/502,092

(22) PCT Filed: Mar. 13, 2003

(86) PCT No.: PCT/US03/07912

§ 371 (c)(1),
(2), (4) Date: Oct. 29, 2004

(87) PCT Pub. No.: WO03/078038

PCT Pub. Date: Sep. 25, 2003

(65) Prior Publication Data

US 2005/0082696 A1    Apr. 21, 2005

Related U.S. Application Data

(63) Continuation-in-part of application No. 10/098,798, filed on Mar. 14, 2002, now abandoned.

(51) Int. Cl.
*B01F 3/04* (2006.01)

(52) U.S. Cl. .................... 261/97; 261/110; 261/114.2

(58) Field of Classification Search ............ 261/97, 261/110, 114.1, 114.2, 114.5; 202/158; 203/71
See application file for complete search history.

(56) References Cited

U.S. PATENT DOCUMENTS

| | | | | |
|---|---|---|---|---|
| 3,218,249 A * | 11/1965 | Ballard et al. | ............ | 208/108 |
| 3,584,844 A * | 6/1971 | Papp | ............ | 261/114.2 |
| 3,693,948 A * | 9/1972 | Kloss | ............ | 261/114.2 |
| 5,158,714 A * | 10/1992 | Shih et al. | ............ | 261/96 |
| 6,769,672 B2 * | 8/2004 | Muller | ............ | 261/114.2 |

\* cited by examiner

*Primary Examiner*—Scott Bushey
(74) *Attorney, Agent, or Firm*—Rutan & Tucker, LLP

(57) ABSTRACT

A bubble cap (400) has a cap (430) with at least one slot (495) and a riser (420), configured with a skirt height (460) of at least 4 cm, such that 1.5*Skirt Height (cm)+[Slot Length (cm)–Exposed Slot Height (cm)] is greater than or equal to 7.5, and posed such that a liquid fluid and a gas flow co-currently upwardly in a space between the riser (420) and the cap (430).

16 Claims, 5 Drawing Sheets

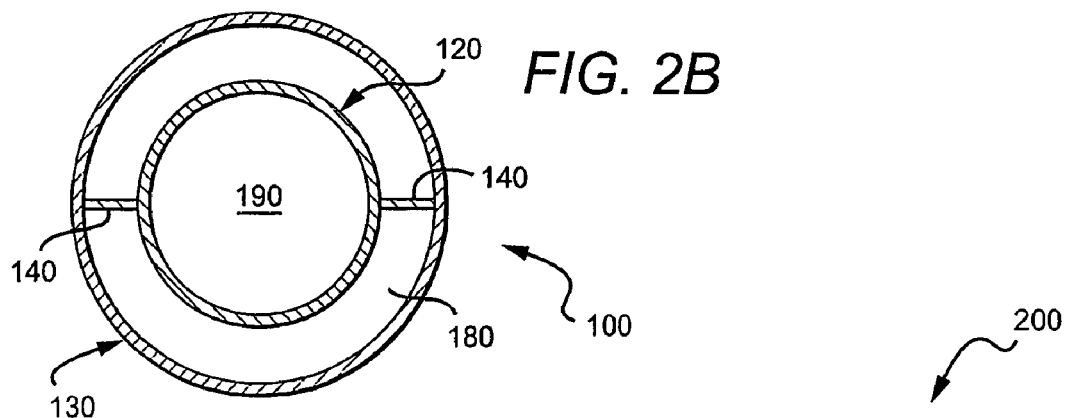
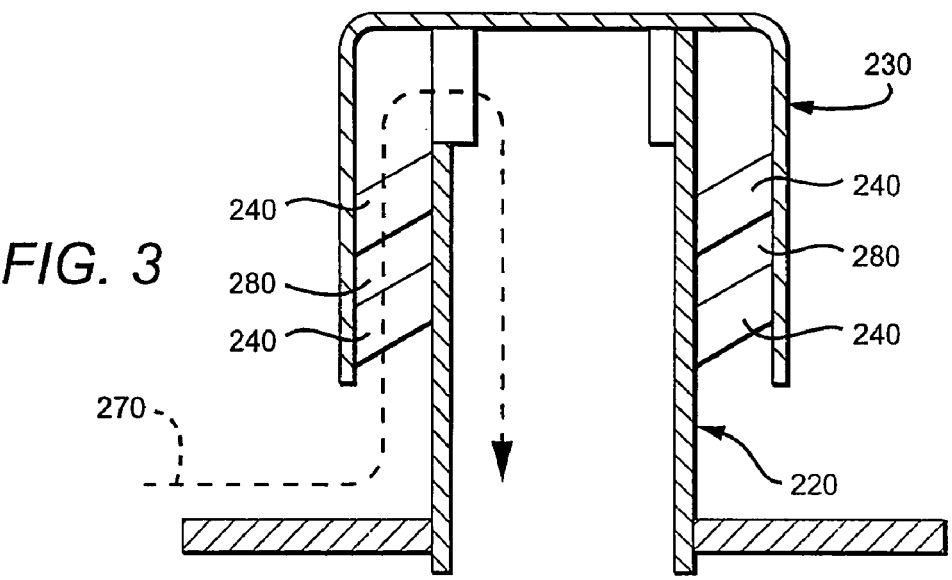
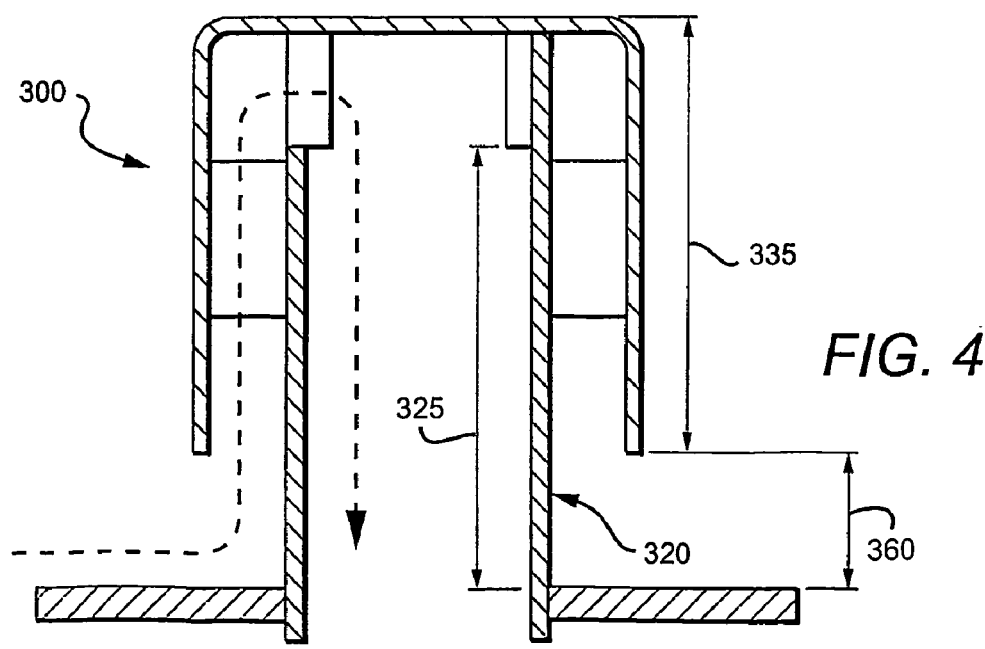

METHODS AND APPARATUS FOR MIXING FLUIDS

This application is a 371 of PCT/US03/07912, filed Mar. 13, 2003, which is a CIP of 10/098,798, filed Mar. 14, 2002, now abandoned.

FIELD OF THE INVENTION

The field of the invention relates to fluid mixing and distribution.

BACKGROUND OF THE INVENTION

Many commercial processes involve mixing of fluids, including especially catalytic reactors and large fractionation columns. Such mixing is not always a simple matter, especially where the fluid has multiple phases (such as liquids and gases/vapors), and where large volumes are being rapidly mixed. Numerous mixing apparatus are known, and some of these are described in U.S. Pat. No. 6,098,965 to Jacobs et al. (August 2000), which is incorporated herein by reference in its entirety. Jacobs et al. teach several improvements, some of which involve bubble caps spaced apart on a distribution plate.

Bubble caps generally comprise a riser and a cap, arranged such that a fluid flows upwards in a space between the cap and the riser, reverses direction and then flows downward through a passageway in the riser. In the absence of swirl directors, the fluid flow path is thus generally in the shape of an inverted "U". Bubble caps are generally affixed to a distribution plate, and the passageway through the riser is confluent with a hole in the distribution plate. Bubble caps often contain a plurality of side slots that provide an entrance for the gas phase into the annular space between the riser and the cap. The gas entrains liquid present in the annular space. See, for example, U.S. Pat. No. 5,158,714 to Shih et al. (October 1992), which is herein incorporated in its entirety by reference.

There must be some mechanism for maintaining the position of the riser with respect to the cap. It is known to use cantilevered arms or other spacers for that purpose. See, for example, U.S. Pat. No. 5,989,502 to Nelson et al. (November 1999) and U.S. Pat. No. 4,305,895 to Heath et al. (December 1981), each of which is incorporated herein in its entirety by reference. In the past, such spacers have always been of minimal size to reduce cost and minimize any flow effects. Prior art spacers therefore exclusively serve a positioning function, and do not materially assist in either fluid flow or mixing.

Skirt height has been shown to materially affect the fluid flow and mixing. See, for example, "Optimum Bubble-Cap Tray Design", Bolles, William L., a four part series in *Petroleum Processing*, Vol. 11, No. 2, pp 65–80; Vol. 11, No. 3, pp 82–95; Vol. 11, No. 4, pp 72–79, Vol. 11, No. 5, pp 109–120, which is incorporated herein in its entirety by reference. In this series of articles, Bolles presents a design methodology for bubble caps of the type commonly used in distillation columns. In such columns, the vapor flow is upward through the bubble cap tray and the liquid flow is transverse, across the bubble cap tray. Such flow is typically described as countercurrent flow. In the Bolles article, at Vol. 11, No. 3, p. 87, a skirt height of 1.3 cm to 3.8 cm is recommended, and there is a suggestion that greater skirt heights would be disadvantageous. There is certainly no teaching, suggestion, or motivation of which the current applicants are aware, for skirt heights greater than 3.8 cm.

Conversely, Ballard et al. (U.S. Pat. No. 3,218,249) teaches the use of bubble caps as a mixing and distribution means for the concurrent downflow of vapor and liquid. Ballard et al. teaches skirt heights of any distance "... above the distribution tray so long as the flow of gas through the downcomers is not sealed off; a reasonable range being from a level corresponding to practically no distance above the tray to a distance of about one foot thereabove." Ballard et al. further teaches that "... the liquid phase, disengaged from the vapor phase by gravity, fills up on tray 18 to a level below the slot depth in the downcomer caps, such level being determined primarily by the gas flow rate per cap. It is, of course, necessary that some of the slot openings be exposed above the liquid surface to permit passage of vapor therethrough. Where the caps have no slots, the liquid level on the tray will be below the bottom rims of the caps for the same reason. Where unslotted caps are used, clearance between the bottom rim and the tray must be maintained to accommodate the passage of gas and liquid thereunder." Clearly, the skirt height dimensional range taught by Ballard, et al. applies specifically to an unslotted cap, because vapor flow through a slotted cap can not be blocked off by reducing the skirt height to practically no distance. There is no teaching of a specific dimensional range suitable for slotted bubble caps.

Shih, et al. (U.S. Pat. No. 5,158,714) teaches the use of a dispersion plate to improve the distribution of liquid exiting the riser. Gamborg, et al. (U.S. Pat. No. 5,942,162) teaches the use of a slotted bubble cap, modified such that the cap is non-concentric with the riser, to improve the uniformity of liquid distribution. Gamborg, et al. describe this modified bubble cap as a vapor lift tube, wherein the cap is called an upflow tube and the riser is called a downflow tube. Nonetheless, the fluid flow path is the shape of an inverted "U", flowing first upward through the upflow tube and then downward through the downflow tube. Jacobs, et al. (U.S. Pat. No. 6,098,965) teaches the use of riser vanes and/or target plates to improve the distribution of liquid exiting the riser. Aside from the patents cited above, the current applicants are not aware of any other information in the public domain that discloses technological advances in the use of bubble caps as a mixing and distribution means for the concurrent downflow of vapor and liquid.

Some systems that utilize bubble caps provide for rough distribution of fluids upstream of the bubble caps. A patent granted to Stangeland, et al. (U.S. Pat. No. 5,690,896 November 1997) describes an apparatus for rough distribution comprising a perforated plate located directly above the bubble cap tray. With this approach, the perforations must pass both the gas phase and liquid phase fluids. As a result, the prevailing liquid level on this tray may be quite low, thereby negatively impacting the quality of rough distribution. A patent granted to Grott, et al. (U.S. Pat. No. 5,837,208 November 1998) describes an apparatus for rough distribution consisting of a perforated tray surrounded by cylindrical wall. With this approach, the gas phase fluid can flow through the annular area between the perforated tray and the reactor wall, while the liquid phase fluid flows primarily through the perforations. One drawback of this approach is that the annularly downflowing gas phase fluid can disturb the liquid surface on the bubble cap tray, thereby negatively impacting the performance of the bubble cap tray. Finally, with both of the above approaches, the perforated trays restrict inspection and maintenance access to the bubble cap tray.

Thus, there is still a need for improved methods and apparatus for mixing and distributing fluids, including improvements to bubble cap trays and rough distribution mechanisms.

SUMMARY OF THE INVENTION

In one aspect, the present invention provides devices and methods in which a bubble cap has a riser and a cap, separated by a divider that extends to a length at least 50% of a distance measured between the top of the riser and the bottom of the cap, this distance henceforth being referred to as the "riser/cap span". In preferred embodiments the divider is preferably at least 70% of the riser/cap span, and more preferably at least 90% of the riser/cap span. The divider may be attached to either or both the riser and the cap, and there may be two or more such dividers.

In another aspect, the present invention provides devices and methods in which the riser and cap cooperate to provide a skirt height suitable for the liquid volumetric rate passing through the tray. The portion of the riser and cap below the liquid surface acts as a hydraulic resistance to liquid cross-flowing the tray. This hydraulic resistance results in a variation in the liquid depth on the tray. Higher liquid depths occur in the areas on the tray where the liquid has been introduced to the tray, while lower liquid depths occur in the areas on the tray where the liquid has arrived by crossflow. These variations in the liquid depth are just as detrimental to the uniformity of liquid distribution as physical variations from levelness of the tray deck itself.

By increasing skirt height, the hydraulic resistance to liquid crossflow is reduced. The preferred skirt height for a specific application is dependent upon, among other things, the liquid volumetric rate passing through the tray. For low liquid rates, bubble caps having a skirt height of no less than 4 cm is preferred. At higher liquid rates, bubble caps having a skirt height of at least 5 cm is more preferred, and at still higher liquid rates, bubble caps having a skirt height of at least 7 cm is more preferred. At very high liquid rates, as may be encountered in very large reactors, bubble caps having a skirt height of 8 cm or higher are contemplated. The unusually high skirt heights are preferably achieved by using an especially long riser rather than using an especially short cap.

In yet another aspect, the present invention provides devices and methods in which chevron-type vanes and plates (e.g., mixing chamber floor and splash deck) cooperate to provide a rough distribution of fluids to subsequent distribution tray(s).

Various objects, features, aspects and advantages of the present invention will become more apparent from the following detailed description of preferred embodiments, along with the accompanying drawing in which like numerals represent like components.

BRIEF DESCRIPTION OF THE DRAWING

FIG. 2B is a horizontal cross-section of the bubble cap taken along the view line 2B—2B of FIG. 2A.

FIG. 3 is a vertical cross-section of another bubble cap, having multiple dividers and an increased skirt height due to a decreased cap length.

FIG. 4 is a vertical cross-section of another bubble cap, having multiple dividers and an increased skirt height due to an increased riser height.

DETAILED DESCRIPTION

Figure 1:
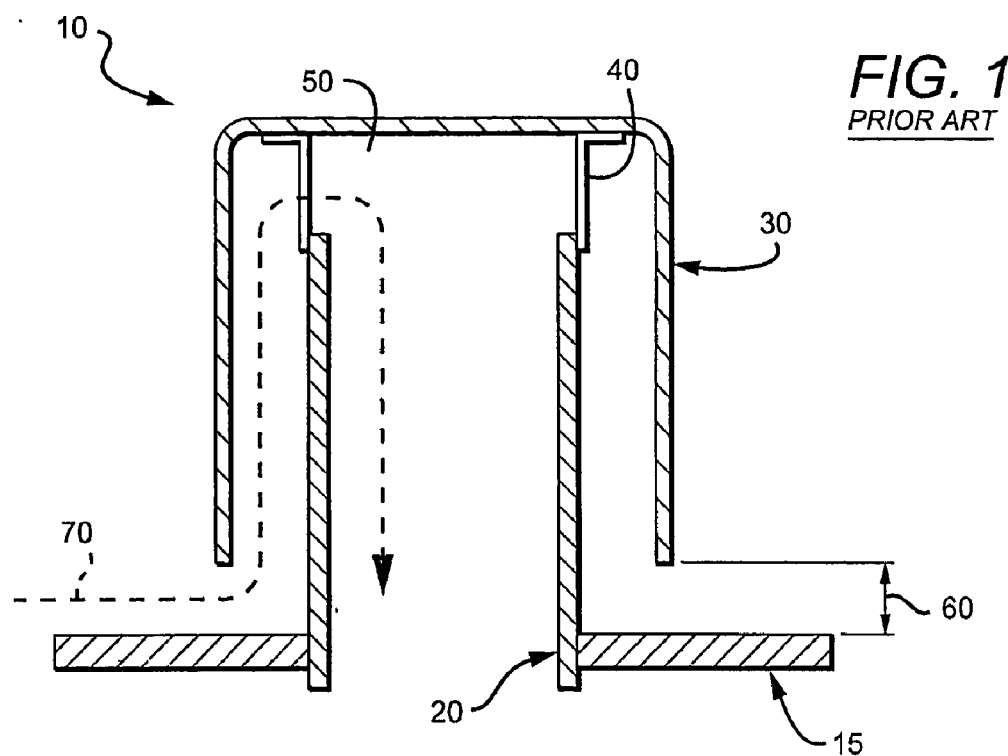
FIG. 1 is a vertical cross-section of a prior art bubble cap.

In FIG. 1, a prior art bubble cap 10 generally comprises a riser 20 and a cap 30 separated by a spacer 40. The bubble cap 10 is attached to a distribution plate 15. The spacer 40 is very small with respect to the lengths of both riser 20 and cap 30, and the skirt height 60 is less than 4 cm. The fluid flow path 70 through the bubble cap is generally in the shape of an inverted "U".

Figure 2A:
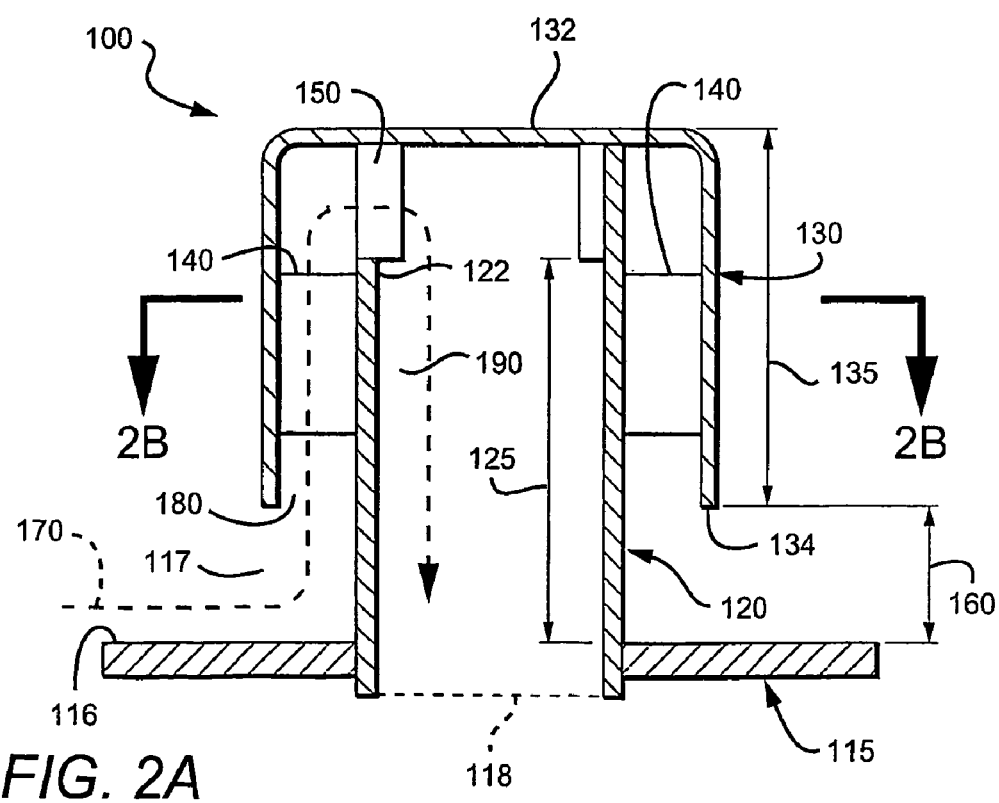
FIG. 2A is a vertical cross-section of a bubble cap according to aspects of the present invention.

In FIGS. 2A and 2B, a bubble cap 100 generally comprises a riser 120 and a cap 130 separated by a plurality of dividers 140. The bubble cap cooperates with a distribution plate 115 to locally mix the fluids. (As used herein, the term "fluid" means anything that flows, including especially a vapor phase or a liquid phase, or a mixture comprising at least two phases. The term also includes any fluid that is mixed and distributed in a commercial process.)

The riser 120 has a top 122 and a riser height 125 defined by a distance between the top 122 of the riser 120 and the top 116 of the distribution plate 115. The riser 120 also defines an inner passageway 190. Contemplated risers can be formed of any suitable material, including carbon steel, stainless steel and other alloys, plastic, and ceramics, depending in large measure upon the temperature and corrosiveness of the fluids being mixed. Such risers can also have virtually any suitable overall dimensions. The overall shapes are also subject to variation. Although tubular risers having circular horizontal cross-sectional areas are preferred, it is also contemplated to provide tubular risers with elliptical, square, rectangular, or other horizontal cross-sectional areas. Risers need not even have uniform passageways along their length. Preferred risers may also have swirl directors 150 above or within (not shown) the passageways.

The cap 130 has a top 132, a bottom edge 134, and a cap length 135 defined by a distance between the top 132 of the cap 130 and the bottom edge 134 of the cap 130. The cap 130 also has a skirt height 160 defined as the distance between the bottom edge 134 of the cap 130 and the top 116 of the distribution plate 115. Contemplated caps can again be formed of any suitable material, including carbon steel, stainless steel and other alloys, plastic, and ceramics, depending again in large measure upon the temperature and corrosiveness of the materials being mixed. Preferred caps have horizontal cross-sectional areas of similar shape to that of the associated riser, but may also have other shapes. For example, a cylindrical cross-section riser may have a rectangular cross-section cap.

The skirt height 160 is a function of the riser height 125, the cap length 135, and the distance between the top 122 of the riser 120 and the top 132 of the cap 130. Preferred bubble caps have a riser 120 and cap 130 that cooperate to provide a skirt height of no less than 4 cm. More preferred bubble caps have a skirt height of at least 4.5 cm, and even more preferred bubble caps have a skirt height of at least 5 cm, at least 7 cm, at least 8 cm, and at least 10 cm. The unusually high skirt heights are preferably achieved by using an especially long riser rather than using an especially short cap, although all combinations are contemplated.

Without being limited to any particular theory or contemplated mode of operation, the present inventors contemplate that a skirt height of no less than 4 cm is advantageous because it enhances cross-flow of fluids moving on the top 116 of the distribution plate 115. Hydraulic calculations show that skirt heights up to 8 cm or higher may also be advantageous, depending largely upon the quantity of the liquid phase being conveyed across the top 116 of the distribution plate 115, and subsequently through the space 180 between the riser 120 and the cap 130 and the riser passageway 190. Although not presently considered to be a preferred embodiment, it is also contemplated that the bubble caps on a distribution plate need not all have the same skirt height. For example, some skirt heights may be less than 5 cm while others are more than 5 cm. Alternatively, all skirt heights may be more than 5 cm, and some may be more than 7 cm. It may even be advantageous for the bubble caps having relatively higher skirt heights to be positioned around the periphery of the distribution plate, or in some other manner, depending, at least in part, on where the fluids are introduced to the distribution plate.

Alternatively, the slots can be lengthened. Preferred slots can be at least 6 cm long, more preferably at least 9 cm long, still more preferably at least 10 cm long, and most preferably at least 12 cm long.

The dividers 140 in FIGS. 2A and 2B preferably span essentially the entire distance from the sidewall of the cap 130 to the sidewall of the riser 120. The dividers are positioned near the top 122 of riser 120. Other embodiments, however, are also contemplated. For example, dividers are currently contemplated to be long enough to have a significant impact on the hydraulics of the fluid flowing in the space 180 between the riser 120 and the cap 130. Preferred dividers 140 impact the fluid hydraulics by having a length of at least 50% of the riser/cap span, preferably 70% of that distance, more preferably 90+% of that distance. In an alternative embodiment (not shown), the dividers can extend from the top of the cap al the way to the bottom edge 134 of the cap. The dividers need not be continuous, in that they may be constructed in several shorter dividers, as long as the sum of the length of the dividers is at least 50% of the riser/cap span. Contemplated dividers (not shown) may also be positioned non-vertically such that they impart a swirl to the fluid rising in the space 180 between the riser 120 and the cap 130. Still further, any suitable number of dividers are contemplated to be utilized in any given bubble cap, including especially from two, three, four, five, or six dividers.

Dividers 140 may be attached to the riser, the cap, or both the riser and the cap. Attachment may be direct or indirect. Some of the dividers may assist in maintaining the positioning of the riser to the cap, and some may not assist very much, or at all, in that regard. Preferred methods of attachment include welding, such as tack-welding, stitch-welding, or any other welding means. Dividers may comprise any suitable material or materials. Swirl director 150 is affixed to the top 122 of the riser 120. The swirl director 150 directs the fluid 170 from a space 180 between the riser 120 and the cap 130 to the riser passageway 190 in a circumferential flow path, which apparently results in a more uniform wetting of the inner wall of the riser 120, and a ring-shaped discharge pattern of the fluid 170, as the fluid 170 exits the riser passageway 190. The swirl director may be continuous with the riser 120, or may be affixed to the riser 120 by welding or any other suitable method. In operation, fluid 170 enters the bubble cap 100 through an opening 117 between the top 116 of the distribution plate 115 and the bottom edge 134 of the cap 130, defined by a skirt height 160. If the bubble cap 100 possesses one or more slots on the side of the cap 130, fluid will also enter the bubble cap 100 therethrough. The fluid 170 then enters the space 180 between the riser 120, the cap 130, and the two dividers 140. The fluid 170 then flows upward through the space 180 and through the swirl director 150 where the fluid 170 is mixed. The fluid then enters the riser 120 and flows downward through the riser passageway 190. The cap length 135 is shorter than the cap length 35 of FIG. 1, allowing the skirt height 160 to be longer than the skirt height 60 of FIG. 1. In the event that two adjacent bubble caps 100 are at different elevations, due perhaps to a tilted distribution tray 115, the two dividers 140 and the skirt height 160 allow more uniform splitting of the fluid 170 between the two adjacent risers than do two adjacent bubble caps 10 of FIG. 1.

The distribution plate 115 is preferably circular, and measures between about 90 cm and about 610 cm in diameter, and between about 0.15 cm and 1 cm thick. The size generally depends upon the size of the reactor in which it is utilized. Currently preferred distribution plates are made from stainless steel and other alloys, although any suitable material, including carbon steel plastics. and ceramics are also contemplated. A typical distribution plate 115 supports between about 60 and about 1200 bubble caps, although lesser or greater numbers of bubble caps are also contemplated. The risers 120 are typically rolled into the distribution plate 115, such that the riser passageways 190 coincide with holes 118 in the distribution plate 115.

As depicted in the Jacobs patent referenced above with respect to other bubble caps, the distribution plate 115 may actually comprise a re-distribution plate because chambered mixing and/or rough distribution may be accomplished upstream. Thus, it should be apparent that distribution plate 115 may be placed at any appropriate position with respect to other processes and apparatus in any mixing reactor.

In FIG. 3, bubble cap 200 is similar to the bubble cap 100 of FIGS. 2A and 2B, except that the bubble cap 200 has four dividers 240 instead of the two dividers 140. In FIG. 3, the four dividers 240 are organized into two sets of two dividers, each set disposed in separate vertical planes within a space 280. Within each set, the two dividers are disposed within one vertical plane within the space 280, and separated within the space 280. As a result, the fluid 270 may pass through the space 280 formed between the riser 220, the cap 230, and past the four dividers 240.

In FIG. 4, bubble cap 300 is again similar to the bubble cap 100 of FIGS. 2A and 2B, except that the bubble cap 300 has a cap length 335 that is shorter than the cap length 135, and a riser height 325 that is shorter than the riser height 125. The result is a skirt height 360 that is equal to the skirt height 160 of the bubble cap 100, even though the riser heights and cap lengths are different.

Figure 5:
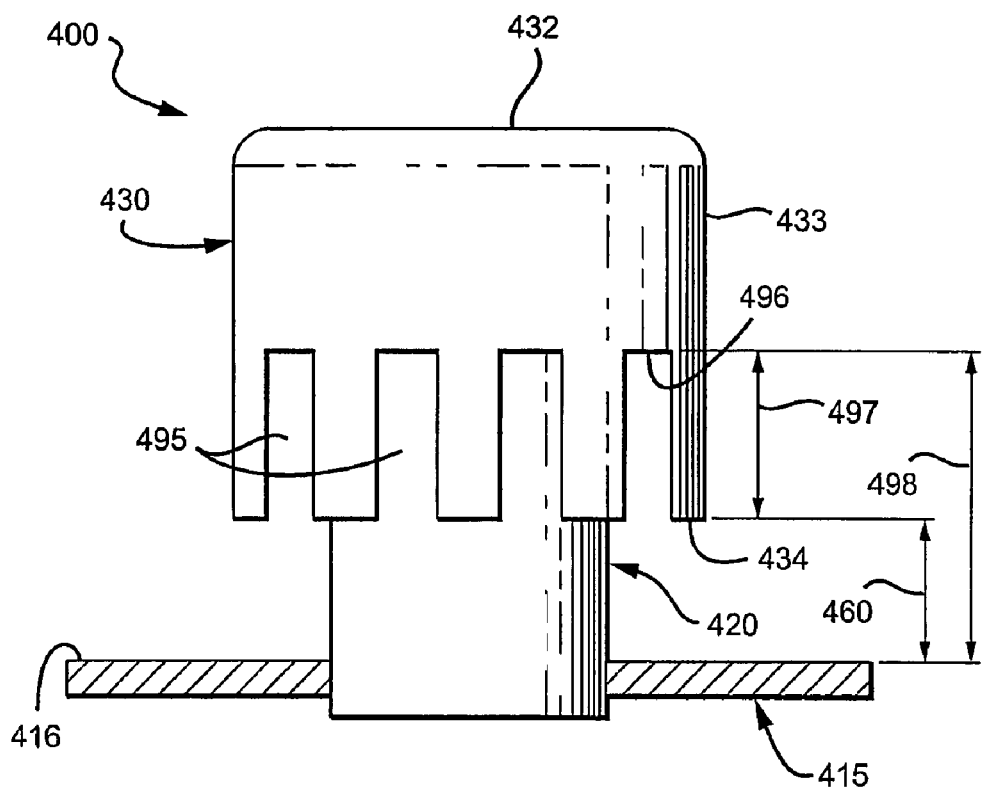
FIG. 5 is a side view of the bubble cap of FIGS. 2A and 2B showing slide slots.

In FIG. 5, bubble cap 400 has a cylindrically curved side 433, in which are disposed multiple side slots 495. Each of the multiple side slots 495 extends downward to the bottom 434 of the cap 430, such that the slot length 497 of any given slot 495 is the distance from the top 496 to the bottom 434 of the cap 430. The slot elevation 498 is defined as the distance between the top 496 of the slot 495 and the top 416 of the distribution plate 415. Among other things, such side slots 495 allow passage into the bubble cap 400 of a fluid 470 being mixed and distributed.

Figure 6:
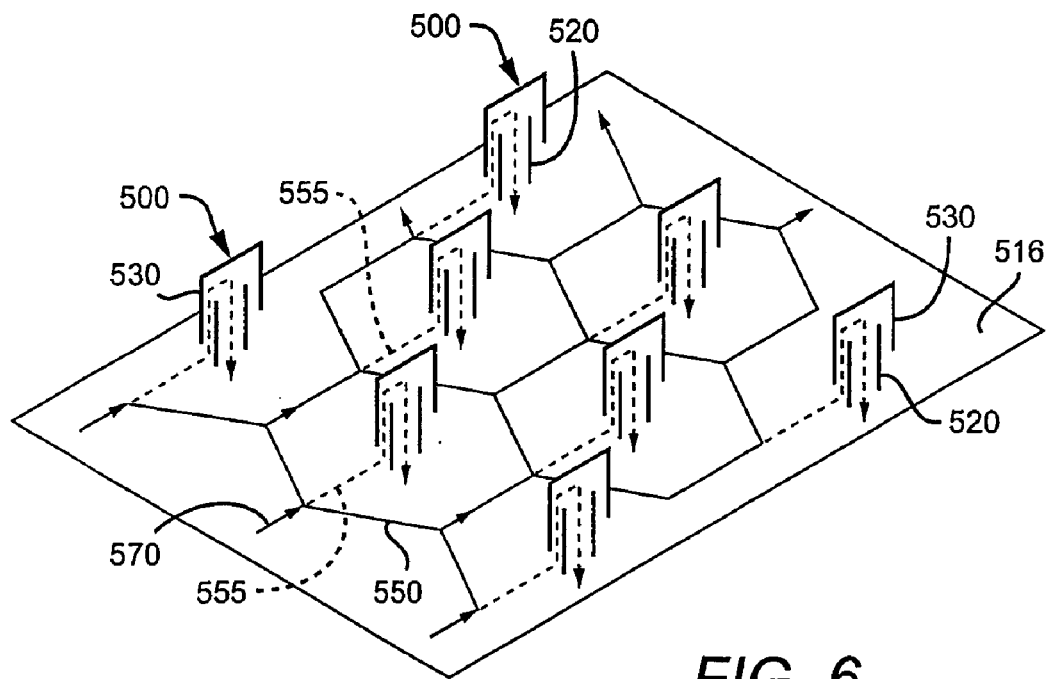
FIG. 6 is a perspective view of a distribution plate having multiple bubble caps, showing fluid cross-flow.

The bubble cap 400 of FIG. 5 has at least eight slots 495, four of which are shown. The slot length 497 is 7 cm, and the slot elevation 498 is 11 cm. In alternative embodiments it is contemplated that the slot length 497 could be anywhere from about 4 to about 30 cm. Slots 495 typically have a generally rectangular shape, although they may have any other suitable shape such as a triangular or other tapering shape, a zigzag shape, and so forth. In FIG. 6, a distribution plate 516 contains a plurality of bubble caps 500. The fluid 570 flows in a zigzag 550 pattern on the distribution plate 516, with the risers 520 and caps 530 creating a hydraulic resistance to crossflow. A portion 555 of the crossflowing fluid 570 is mixed and distributed by the bubble caps. The plurality of bubble caps 500 may vary in quantity, depending on a variety of factors. Two of the factors are the cap center-to-center spacing, which influences the number of caps per unit of distribution tray area, and the size of the reactor or any other commercial process being used to mix and distribute fluids. Furthermore, the plurality of bubble caps 500 maybe distributed on the distribution plate 516 in any manner, preferably in a symmetrical manner to achieve a symmetrical distribution of the fluid. There may or may not be indentations, channels, baffles, or other paths (not shown) disposed in or on the distribution plate 516 to modify the cross-flow 550.

Figure 7A:
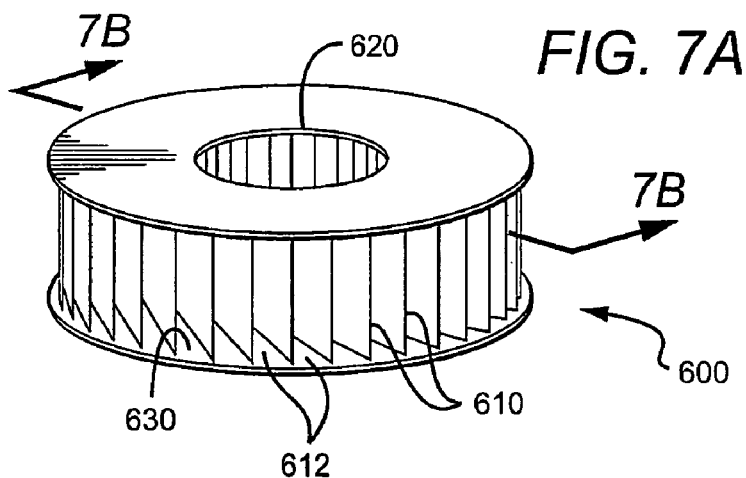
FIG. 7A is a perspective view of a distribution apparatus having chevron-type vanes.
Figure 7B:
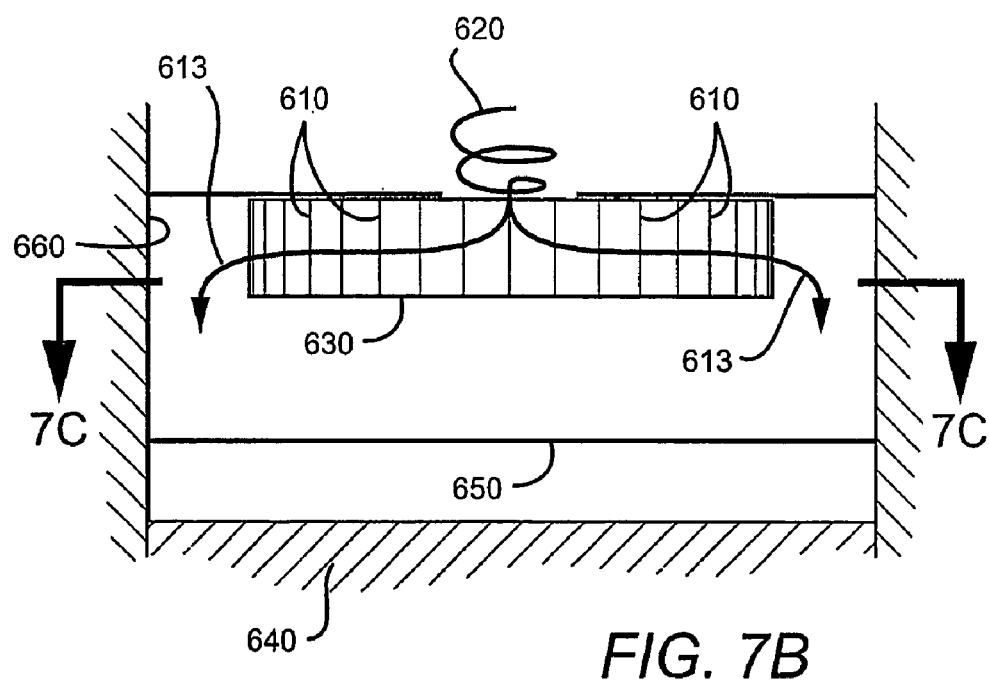
FIG. 7B is a vertical cross-section of the distribution apparatus of FIG. 7A taken along line 7B—7B, and surrounding apparatus.
Figure 7C:
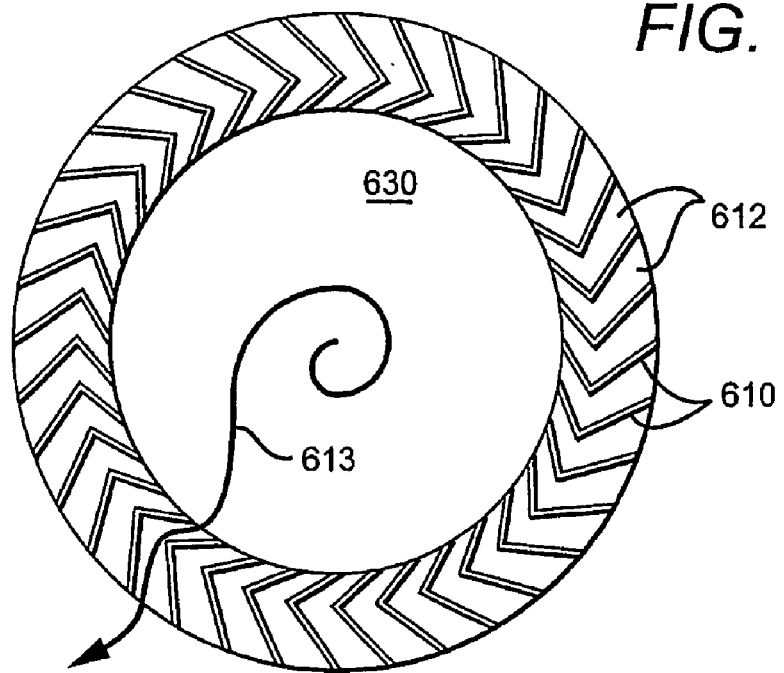
FIG. 7C is a horizontal cross-section of a chevron-type vane in the distribution apparatus of FIG. 7B taken along line 7C—7C.

In FIGS. 7A, 7B and 7C, a rough distribution apparatus 600 contains a plurality of chevron-type vanes 610. The vanes are disposed between an outlet of a mixing apparatus 620 and a splash deck 630. The presence of the splash deck 630 forces the fluid exiting the mixing apparatus to flow outward through the passageways 612 formed by chevron-type vanes 610 along paths 613. The splash deck 630 is preferably imperforate, but may contain orifices (not shown) to allow a portion of the fluid to pass downward onto the subsequent distribution tray 650 (which may be the final distribution tray).

By way of reference, FIG. 7B depicts catalyst bed 640 below subsequent distribution tray(s) 650, and reactor wall 660.

In a preferred embodiment, the chevron-type vanes 610 are positioned below the substantially imperforate floor of a mixing chamber (not shown), above a substantially imperforate splash deck 630, and surround the outlet orifice(s) 620 of an upstream mixing chamber (not shown). The vane passageways 612 thereby formed cause the fluids flowing therethrough to change directions preferably at least two times and provide the sole means of fluid communication between the upstream mixing chamber and the downstream subsequent distribution tray 650. The chevron-type vanes 610 result in a more uniform velocity profile of the fluid exiting the vane passageways 612, thereby providing more effective rough distribution of the fluid to the subsequent distribution tray 650. When used in conjunction with a mixing chamber that swirls the fluids being mixed therein, the chevron-type 610 vanes also serve to reduce the tangential component of the fluid velocity. When arranged in circular layout that is concentric with a central outlet orifice of the mixing chamber, the chevron-type vanes 610 promote a liquid discharge pattern, exiting the vane passageways 612, such that the liquid is supplied to the subsequent distribution tray 650 in an annular ring (not shown). This annular ring supply pattern is an extremely effective method of supplying liquid to the subsequent distribution tray 650, provided that the diameter of the ring produced by the liquid is near optimal. The optimal ring diameter is dependent upon the geometry of the final distribution tray 650 and can be determined by hydraulic calculations. Although chevron-type vanes have been depicted in FIGS. 7A, 7B, and 7C, other flow redirecting-type vanes have been contemplated. Several examples are depicted in FIGS. 8 and 9.

Figure 8:
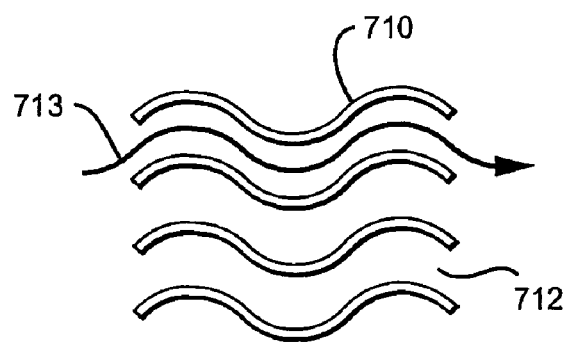
FIG. 8 is a horizontal cross-section of a wave plate-type vane.

In FIG. 8, wave plate-type vanes 710 are spaced apart to form vane passageways 712, the passageways providing a flow path 713 for fluids to pass therethrough.

Figure 9:
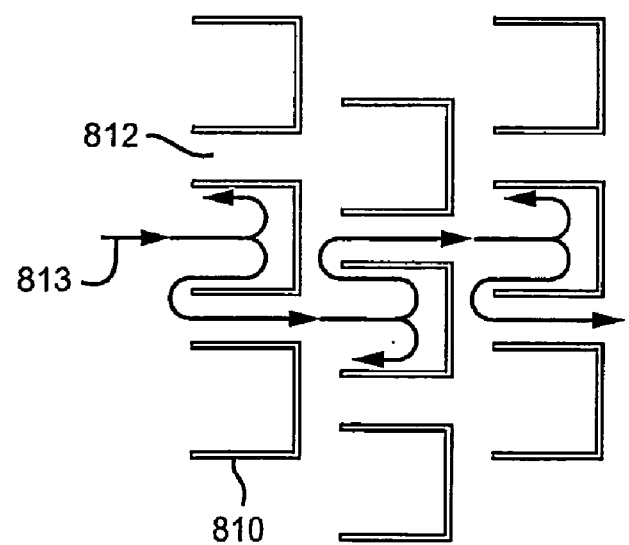
FIG. 9 is a horizontal cross-section of a staggered channel-type vane.

In FIG. 9, staggered channel-type vanes 810 are spaced apart to form vane passageways 812, the passageways providing a flow path 813 for fluids to pass therethrough.

By way of clarification, many different combinations of skirt heights with numbers of slots and slot lengths are contemplated to be commercially important. The following table lists some of those combinations.

| Number of Slots | Skirt Height (cm) | Slot Length (cm) |
|---|---|---|
| At least 1 | No less than 7 | At least 6 |
| " | " | At least 9 |
| " | " | " |
| " | No less than 10 | At least 6 |
| " | " | At least 9 |
| " | " | " |
| At least 3 | No less than 4 | At least 6 |
| " | " | At least 9 |
| " | " | At least 12 |
| " | No less than 7 | At least 6 |
| " | " | At least 9 |
| " | " | At least 12 |
| " | No less than 10 | At least 6 |
| " | " | At least 9 |
| " | " | At least 12 |
| At least 5 | No less than 4 | At least 6 |
| " | " | At least 9 |
| " | " | At least 12 |
| " | No less than 7 | At least 6 |
| " | " | At least 9 |
| " | " | At least 12 |
| " | No less than 10 | At least 6 |
| " | " | At least 9 |
| " | " | At least 12 |
| At least 7 | No less than 4 | At least 6 |
| " | " | At least 9 |
| " | " | At least 12 |
| " | No less than 7 | At least 6 |
| " | " | At least 9 |
| " | " | At least 12 |
| " | No less than 10 | At least 6 |
| " | " | At least 9 |
| " | " | At least 12 |

The portion of the riser and cap below the liquid surface acts as a hydraulic resistance to the liquid crossflowing the tray. Referring once again to FIG. 5, the height of the liquid surface above the tray deck is equal to the skirt height 460 plus the slot length 496 minus the exposed (or unsubmerged) slot height. The gas enters the space between the cap and the riser through the portion of each slot 495 that is exposed.

For bubble caps with vertical, rectangular slots, the exposed slot height can be estimated from the following equation:

$$\text{Exposed slot height (cm)} = 44.2 * X^{0.52},$$

where $$X = Q_v * (W_s * N_s)^{-1} * [\rho_v/(\rho_l - \rho_v)]^{0.5},$$

where:
$Q_v$=vapor/gas volumetric rate flowing through cap (actual m³/min.);
$W_s$=mean slot width (cm);
$N_s$=number of slots;
$\rho_v$=vapor/gas density (kg/m³); and
$\rho_l$=liquid density (kg/m³).

Similar equations can be derived and utilized to estimate exposed slot height for slots of alternate shapes, such as trapezoidal- or triangular-shaped slots. Slots widths may vary from 0.1 cm to 2.5 cm or more. Preferred slots widths are in the range of 0.25 cm to 1.25 cm. The number of slots utilized may vary widely, from 1 to 10 or more, depending upon, for example, the cap size and geometry, and the gas volumetric rate flowing through the cap.

Stated in other terms, inventive subject matter resides in a bubble cap comprising a cap with at least one, three, five, or seven slot(s), and a riser, configured with a skirt height of at least 4 cm such that 1.5*Skirt Height (cm)+[Slot Length (cm)−Exposed Slot Height (cm)]≧7.5, 15, 22.5, or 30, and posed such that a liquid fluid and a gaseous fluid flow co-currently upwardly in a space between the riser and the cap.

Thus, specific embodiments and applications of mixing and distributing fluids have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A bubble cap for use in a reactor in which a gaseous fluid having a vapor density and a liquid fluid having a liquid density flow concurrently downwards in the reactor, the bubble cap comprising:
   a cap with at least one slot and a riser, configured with a skirt height of at least 4 cm such that 1.5*Skirt Height (cm)+[Slot Length (cm)−Exposed Slot Height (cm)]≧7.5, wherein the Exposed Slot Height is determined to equal $44.2*X^{0.52}$;
   wherein X is $Q_v*(W_s*N_s)^{-1}*[\rho_v/(\rho_l-\rho_v)]^{0.5}$, wherein $Q_v$ is a vapor volumetric rate flowing through the cap, $W_s$ is mean slot width (cm), $N_s$ is number of slots, $\rho_v$ is the vapor density (kg/m³), and $\rho_l$ is the liquid density (kg/m³) and;
   wherein the bubble cap is disposed such that the liquid fluid and the gaseous fluid flow co-currently upwardly in a space between the riser and the cap.

2. The bubble cap of claim 1, wherein 1.5*Skirt Height (cm)+[Slot Length (cm)−Exposed Slot Height (cm)]≧15.

3. The bubble cap of claim 1, wherein 1.5*Skirt Height (cm)+[Slot Length (cm)−Exposed Slot Height (cm)]≧22.5.

4. The bubble cap of claim 1, wherein 1.5*Skirt Height (cm)+[Slot Length (cm)−Exposed Slot Height (cm)]≧30.

5. A bubble cap for use in a reactor in which a gaseous fluid having a vapor density and a liquid fluid having a liquid density flow concurrently downwards in the reactor, the bubble cap comprising:
   a cap with at least three slots and a riser, configured with a skin height of at least 4 cm such that 1.5*Skin Height (cm)+[Slot Length (cm)−Exposed Slot Height (cm)]≧7.5, wherein the Exposed Slot Height is determined to equal $44.2*X^{0.52}$,
   wherein X is $Q_v*(W_s*N_s)^{-1}*[\rho_v/(\rho_l-\rho_v)]^{0.5}$, wherein $Q_v$ is a vapor volumetric rate flowing through the cap, $W_s$ is mean slot width (cm), $N_s$ is number of slots, $\rho_v$ is the vapor density (kg/m³), and $\rho_l$ is the liquid density (km/m³); and
   wherein the bubble cap is disposed such that the liquid fluid and the gaseous fluid flow co-currently upwardly in a space between the riser and the cap.

6. The bubble cap of claim 5, wherein 1.5*Skirt Height (cm)+[Slot Length (cm)−Exposed Slot Height (cm)]≧15.

7. The bubble cap of claim 5, wherein 1.5*Skirt Height (cm)+[Slot Length (cm)−Exposed Slot Height (cm)]≧22.5.

8. The bubble cap of claim 5, wherein 1.5*Skirt Height (cm)+[Slot Length (cm)−Exposed Slot Height (cm)]≧30.

9. A bubble cap for use in a reactor in which a gaseous fluid having a vapor density and a liquid fluid having a liquid density flow concurrently downwards in the reactor, the bubble cap comprising:
   a cap with at least five slots and a riser, configured with a skin height of at least 4 cm such that 1.5*Skin Height (cm)+[Slot Length (cm)−Exposed Slot Height (cm)]≧7.5, wherein the Exposed Slot Height is determined to equal $44.2*X^{0.52}$;
   wherein X is $Q_v*(W_s*N_s)^{-1}*[\rho_v/(\rho_l-\rho_v)]^{0.5}$, wherein $Q_v$ is a vapor volumetric rate flowing through the cap, $W_s$ is mean slot width (cm), N, is number of slots, $\rho_v$ is the vapor density (kg/m³), and $\rho_l$ is the liquid density (kg/m³) and;
   wherein the bubble cap is disposed such that the liquid fluid and the gaseous fluid flow co-currently upwardly in a space between the riser and the cap.

10. The bubble cap of claim 9, wherein 1 5*Skirt Height (cm)+[Slot Length (cm)−Exposed Slot Height (cm)]≧15.

11. The bubble cap of claim 9, wherein 1.5*Skirt Height (cm)+[Slot Length (cm)−Exposed Slot Height (cm)]≧22.5.

12. The bubble cap of claim 9, wherein 1.5*Skirt Height (cm)+[Slot Length (cm)−Exposed Slot Height (cm)]≧30.

13. A bubble cap for use in a reactor in which a gaseous fluid having a vapor density and a liquid fluid having a liquid density flow concurrently downwards in the reactor, the bubble cap comprising:
   a cap with at least seven slots and a riser, configured with a skirt height of at least 4 cm such that 1.5*Skin Height (cm)+[Slot Length (cm)−Exposed Slot Height (cm)]≧7.5, wherein the Exposed Slot Height is determined to equal $44.2=X^{0.52}$;
   wherein X is $Q_v*(W_s*N_s)^{-1}*[\rho_v/(\rho_l-\rho_v)]^{0.5}$, wherein $Q_v$ is a vapor volumetric rate flowing through the cap, $W_s$ is mean slot width (cm), $N_s$ is number of slots, $\rho_v$ is the vapor density (kg/m³), and $\rho_l$ is the liquid density (km/m³) and;
   wherein the bubble cap is disposed such that the liquid fluid and the gaseous fluid flow co-currently upwardly in a space between the riser and the cap.

14. The bubble cap of claim 13, wherein 1.5*Skirt Height (cm)+[Slot Length (cm)−Exposed Slot Height (cm)]≧15.

15. The bubble cap of claim 13, wherein 1.5*Skirt Height (cm)+[Slot Length (cm)−Exposed Slot Height (cm)]≧22.5.

16. The bubble cap of claim 13, wherein 1.5*Skirt Height (cm)+[Slot Length (cm)−Exposed Slot Height (cm)]≧30.

* * * * *